(12) United States Patent
Althoff

(10) Patent No.: US 10,771,993 B2
(45) Date of Patent: Sep. 8, 2020

(54) METHOD FOR DETERMINING A QUALITY OF AT LEAST ONE MOBILE RADIO NETWORK

(71) Applicant: P3 Communications GmbH, Aachen (DE)

(72) Inventor: Marc Peter Althoff, Mönchengladbach (DE)

(73) Assignee: P3 Communications GmbH, Aachen (DE)

( * ) Notice: Subject to any disclaimer, the term of this patent is extended or adjusted under 35 U.S.C. 154(b) by 0 days.

(21) Appl. No.: 16/212,837

(22) Filed: Dec. 7, 2018

(65) Prior Publication Data
US 2019/0281479 A1    Sep. 12, 2019

(30) Foreign Application Priority Data
Dec. 7, 2017 (DE) .......... 10 2017 129 165

(51) Int. Cl.
*H04L 12/26* (2006.01)
*H04W 24/08* (2009.01)
(Continued)

(52) U.S. Cl.
CPC .......... *H04W 24/08* (2013.01); *G05D 1/0022* (2013.01); *G05D 1/0094* (2013.01);
(Continued)

(58) Field of Classification Search
CPC ..... H04W 24/08; H04W 24/10; H04W 88/08; H04W 24/02; H04W 72/042
See application file for complete search history.

(56) References Cited

U.S. PATENT DOCUMENTS 9,456,361 B1   9/2016 Levy
9,467,922 B1  10/2016 Buchmueller
(Continued)

OTHER PUBLICATIONS

German Office Action issued in related DE102017129165.2 dated Jul. 12, 2018 by the German Patent Office (pp. 11).
(Continued)

*Primary Examiner* — Atique Ahmed
(74) *Attorney, Agent, or Firm* — Woodard, Emhardt, Henry, Reeves & Wagner, LLP

(57) ABSTRACT

The subject of the invention is a method for determining a quality of at least one mobile communications network in an air corridor (8), which method comprises:
an unmanned aerial vehicle (1) comprising a mobile communications receiver (3) configured to determine the quality of the at least one mobile communications network, and comprising a positioning device (4) configured to determine a position of the unmanned aerial vehicle (1) in the air corridor (8), and comprises the steps:
arranging a plurality of radio-based control devices (2) along a ground path (6) corresponding to a linear path (7) in the air corridor (8), each of said control devices (2) being configured to control the unmanned aerial vehicle (1) through the air corridor (8) and being spaced apart from one another on the ground (5), such that the unmanned aerial vehicle (1) when flying the linear path (7) at no position is farther than in visual contact range (9) from at least one of the control devices (2);
flying the unmanned aerial vehicle (1) along the linear path (7) by controlling the unmanned aerial vehicle (1) by means of the plurality of control devices (2) in turn; and
during the flying of the linear path (7), determining the quality of the at least one mobile communications network at the given position in the air corridor (8).

14 Claims, 1 Drawing Sheet

(51) Int. Cl.
*G05D 1/00* (2006.01)
*G05D 1/10* (2006.01)
*H04W 24/10* (2009.01)

(52) U.S. Cl.
CPC ............ *G05D 1/101* (2013.01); *H04W 24/10* (2013.01); *G05D 1/0083* (2013.01)

(56) References Cited

U.S. PATENT DOCUMENTS

| | | | |
|---|---|---|---|
| 9,537,561 B1 | 1/2017 | Kotecha | |
| 9,781,609 B1 | 10/2017 | Kurtz | |
| 2004/0141170 A1* | 7/2004 | Jamieson | G01S 7/483 |
| | | | 356/5.01 |
| 2005/0143062 A1* | 6/2005 | Dowling | H04W 24/00 |
| | | | 455/423 |
| 2010/0250022 A1* | 9/2010 | Hines | G05D 1/101 |
| | | | 701/2 |
| 2012/0280087 A1* | 11/2012 | Coffman | G05D 1/0016 |
| | | | 244/175 |
| 2015/0256403 A1* | 9/2015 | Li | H04L 27/2602 |
| | | | 370/235 |
| 2016/0150427 A1 | 5/2016 | Ramanath | |
| 2016/0171896 A1* | 6/2016 | Buchmueller | G05D 1/0088 |
| | | | 701/3 |
| 2016/0269917 A1 | 9/2016 | Hillegas | |
| 2016/0327956 A1* | 11/2016 | Zhang | B64C 39/024 |
| 2016/0371985 A1 | 12/2016 | Kotecha | |
| 2017/0012697 A1* | 1/2017 | Gong | B64C 39/024 |
| 2017/0013478 A1 | 1/2017 | Singh | |
| 2017/0025021 A1* | 1/2017 | Song | G08G 5/0034 |
| 2017/0029107 A1* | 2/2017 | Emami | B64C 39/024 |
| 2017/0168480 A1 | 6/2017 | Wänstedt | |
| 2019/0019418 A1* | 1/2019 | Tantardini | G01S 7/003 |

OTHER PUBLICATIONS

Machine translation of Office Action received in related DE102017129165.2 dated Jul. 12, 2018 by the German Patent Office (pp. 5).

* cited by examiner

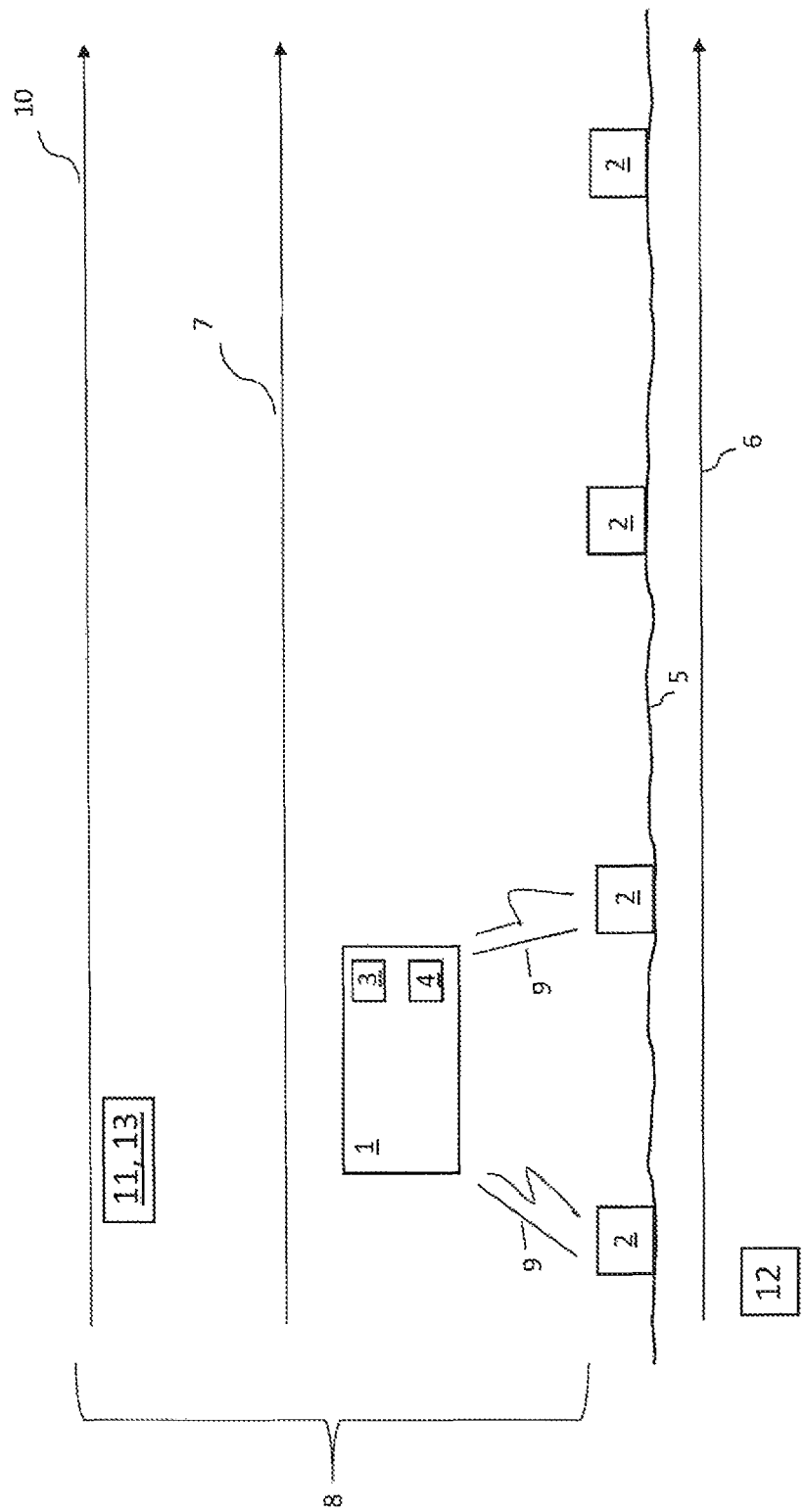

METHOD FOR DETERMINING A QUALITY OF AT LEAST ONE MOBILE RADIO NETWORK

TECHNICAL FIELD

The invention relates to a method for determining a quality of at least one mobile communications network in an air corridor, which method comprises an unmanned aerial vehicle comprising a mobile communications receiver configured to determine the quality of at least one mobile communications network, and comprising a positioning device configured to determine a position of the unmanned aerial vehicle in the air corridor. The invention also relates to an arrangement comprising the unmanned aerial vehicle.

BACKGROUND OF THE INVENTION

In order to determine a terrestrial quality of a mobile communications network, measurement vehicles are used to perform "drive tests" in which measurements are repeatedly carried out along a predetermined driving route using mobile communications receivers provided in the measurement vehicle. As measurements, voice connections and/or data connections are established to different destinations in order to use a measured call setup time or speed of an Internet connection to draw conclusions about the quality of the mobile communications network used. In order to design the measurements to be as realistic as possible, mobile phones that are commercially available to end users are employed as the mobile communications receivers, and these are often connected to antennas arranged outside the measurement vehicle.

Nowadays, unmanned aerial vehicles are being used increasingly for a vastly varied range of uses, for instance for delivering goods or medical supplies in inaccessible terrain. Regulations stipulate that the unmanned aerial vehicles, known as UAVs or drones, are normally allowed to be flown only in visual navigation under line of sight, LOS, between a pilot of the unmanned aerial vehicle and the unmanned aerial vehicle. Numerous applications require autonomous operation, however, in which the unmanned aerial vehicle is flown without LOS, under what is known as NLOS. In such a case, the pilot only makes contact when required, while the unmanned aerial vehicle otherwise flies completely autonomously.

The pilot normally controls the unmanned aerial vehicle by a control device, also called a remote control, which communicates with the unmanned aerial vehicle by means of radio signals. For cost reasons alone, a link to a terrestrial mobile communications network is desirable for autonomous operation of the unmanned aerial vehicle in order for the pilot to be able to make necessary contact when required via the mobile communications connection. This requires, however, that the unmanned aerial vehicle maintains a continuous connection to the terrestrial mobile communications network during its entire flight route comprising frequently changing flight heights and speeds.

Yet until now, little has been known of the quality of terrestrial mobile communications networks at different heights, because the mobile communications networks are planned solely on the basis of terrestrial measurements, for instance on the basis of the results of the drive test described above. Nonetheless, it can be expected in future that the legislature will give clearance to autonomous air traffic of unmanned aerial vehicles in designated and suitably qualified air corridors. In these air corridors, continuous provision by a terrestrial mobile communications network would have to be guaranteed at different heights and speeds in order to avoid dangerous flight situations for the unmanned aerial vehicles.

DESCRIPTION OF THE INVENTION

Proceeding from this situation, it is an object of the present invention to define a cost-effective method for determining for the first time and/or regularly a quality of at least one mobile communications network in an air corridor for the safe autonomous operation of unmanned aerial vehicles in the air corridor.

The object of the invention is achieved by the features of the independent claims. The dependent claims define advantageous embodiments.

The object is accordingly achieved by a method for determining a quality of at least one mobile communications network in an air corridor, which method comprises an unmanned aerial vehicle comprising a mobile communications receiver configured to determine the quality of the at least one mobile communications network, and comprising a positioning device configured to determine a position of the unmanned aerial vehicle in the air corridor, and comprises the steps:
  arranging a plurality of radio-based control devices along a ground path corresponding to a linear path in the air corridor, each of said control devices being configured to control the unmanned aerial vehicle through the air corridor and being spaced apart from one another on the ground, such that the unmanned aerial vehicle when flying the linear path, in particular the entire linear path, at no position is farther than in visual contact range from at least one of the control devices;
  flying the unmanned aerial vehicle along the linear path by controlling the unmanned aerial vehicle by means of the plurality of control devices in turn; and
  during the flying of the linear path, determining the quality of the at least one mobile communications network at the given position in the air corridor.

An essential point of the invention is that the unmanned aerial vehicle is equipped with a mobile communications receiver for determining the quality of the at least one mobile communications network so that the unmanned aerial vehicle can determine the quality of the at least one mobile communications network at its current position in the air corridor, in particular during the entire flight along the linear path. In addition, radio-based control devices are provided, spaced apart from one another, along the ground path corresponding to the linear path, so that the unmanned aerial vehicle can be navigated by one or more pilots segment by segment by means of line of sight between the relevant control unit and the unmanned aerial vehicle. The radio-based control devices are preferably designed to be able to be used to control the aerial vehicle. The aerial vehicle is therefore preferably navigated by the pilot by means of the control device. The unmanned aerial vehicle can thus travel the entire linear path without interruption and determine during the flight the quality of the at least one mobile communications network at the given position in the air corridor. The local provision deficiencies of the at least one mobile communications network can be detected using the quality determined in this way and improved by subsequent measures.

If, for example, the linear path equals 5 km, five radio-based control devices can be positioned on the ground path each at a spacing of approximately 1 km. After the unmanned aerial vehicle is launched, initially the first control device performs the control or navigation of the unmanned aerial vehicle, which after 0.5 to 1 km flight distance is succeeded by the second control device, and so on, until the fifth control device can land, for instance, the unmanned aerial vehicle at the end of the ground path. In other words, the control of the unmanned aerial vehicle is passed segment by segment from one control device to the next control device, so that there is no need to land the unmanned aerial vehicle intermittently and, when using a single control device, to relocate this control device.

In summary, the method proposes that the unmanned transport device is navigated by the control devices, which are spaced along the ground path, in particular is navigated successively, along the linear path in visual navigation, and in the process measures the quality of the at least one mobile communications network at its current position in the air corridor. The measurement data acquired in this way could be transmitted after and/or during the flight collectively to a ground station and/or evaluation device for further evaluation of said data, and could be analysed in terms of any optimization of the at least one mobile communications network that may be necessary.

In the context of the invention, a mobile communications network refers to a technical infrastructure that can be used to transmit signals for the transmission of data and voice between a mobile communications antenna of the mobile communications network and the mobile communications receiver, for instance a mobile phone, a smartphone, a tablet and/or an industrial mobile communications terminal. An industrial mobile communications terminal comprises, for example, a mobile communications modem and/or a router for transmitting mobile communications signals by means of an Internet protocol in order to exchange control data and/or navigation data with the unmanned aerial vehicle. The mobile communications receiver preferably comprises transceivers in order to communicate with a terrestrial mobile communications network in accordance with the Long Term Evolution, LTE, standard. The mobile communications receiver is preferably also configured to determine or measure the quality of a plurality of mobile communications networks simultaneously and/or successively. Equally, the unmanned aerial vehicle can be equipped with a plurality of mobile communications receivers, which each determine the quality of a different mobile communications network. The mobile communications network is preferably designed on the basis of a Global System for Mobile Communications, GSM, General Packet Radio Services, GPRS, Universal Mobile Telecommunications System, UMTS, Long Term Evolution, LTE, or a successor standard.

In the context of the invention, an unmanned aerial vehicle in particular refers to an aerial vehicle that navigates itself autonomously without human crew and/or can be controlled by the control device, a computer or other controller from the ground as remote controller or remote control. Unmanned aerial vehicles, UAV, are often called drones and are embodied, for example, as quadcopters. The unmanned aerial vehicle preferably comprises a computer-based controller in order to exchange with the radio-based control device, signals for controlling and/or navigating the unmanned aerial vehicle by means of the radio link and/or by means of the mobile communications receiver. Determining the quality of the at least one mobile communications network comprises, for example, repeatedly establishing data connections and/or voice connections to different destinations, for instance to a ground station, another terrestrial evaluation device and/or other destinations. It is possible to use measured call setup times and/or speeds of an Internet connection to draw conclusions about the quality of the mobile communications network used.

In principle, the positioning device can comprise any system such as distance, angle and/or elevation measurement and/or astronomical radio and/or satellite position-fixing in order to detect the position of the unmanned aerial vehicle in the air corridor, in particular geographical width, length and/or height relative to the ground and/or relatively above standard elevation zero.

The positioning device is preferably designed to receive signals from navigation satellites and/or pseudolites, for instance for receiving the signals from the Global Positioning System, GPS, Global Navigation Satellite System, GLONASS, Galileo, and/or Beidou system. The air corridor preferably comprises a spatially bounded zone along the linear path, which extends, for example, over a distance of 10 km at a height between 100 and 300 m above the ground and having a width of 500 m, although other dimensions are equally possible.

In the simplest case, the control device can be designed as a remote control, which the pilot uses to control the unmanned aerial vehicle by visual navigation, in other words in accordance with LOS rules. Depending on the weather conditions and transmit power of the control device, the visual contact range can accordingly equal 500 m or 1 km, for example. In the latter case, for the aforementioned method, this means that two control devices can be arranged at a distance of no more than 1 km apart from each other on the ground path. The ground path preferably runs parallel or approximately parallel to the linear path, which runs at a distance of 100 to 300 m, for example, from the ground.

According to a preferred development, the method comprises the step: repeating the steps of flying the, and/or an additional, unmanned aerial vehicle and determining the quality of the at least one mobile communications network; and/or flying the, and/or the additional, unmanned aerial vehicle along the linear path in an outward direction and in a return direction; and/or determining the quality of the at least one mobile communications network at the given position by statistical averaging of the qualities determined during the repeated individual flights and/or the individual flights in the outward direction and return direction. By repeated flying of the linear path and/or additional, in particular parallel, linear paths in the air corridor, whether in the same direction and/or in the outward and return direction, it is possible to obtain substantially more reliable and thus more meaningful information about the quality of the at least one mobile communications network. In this process, a plurality of unmanned aerial vehicles can fly down the air corridor one after the other, in parallel with one another and/or offset from one another, in order to determine the quality of the at least one mobile communications network. Statistical techniques known from the prior art are advantageously applied to the qualities measured during the individual flights.

According to another preferred development, the method comprises in this regard the step: flying the unmanned aerial vehicle during the individual flights at a predetermined constant height relative to the ground or at a constant relative height above standard elevation zero; and/or flying the unmanned aerial vehicle during the individual flights at different predetermined heights relative to the ground and/or to standard elevation zero. By flying the unmanned aerial vehicle at different heights, the quality of the at least one mobile communications network can be determined for these different heights, so that it is thus possible to obtain a type of three-dimensional map of the quality of the at least one mobile communications network in the air corridor.

According to another preferred embodiment, the method comprises the steps: flying the unmanned aerial vehicle along the already flown linear path at a first height relative to the ground and/or to standard elevation zero; flying a second unmanned aerial vehicle along a second linear path spaced apart from the linear path at a second height relative to the ground and/or to standard elevation zero by the unmanned aerial vehicle controlling the unmanned second aerial vehicle; and during the flying of the second linear path, determining the quality of the at least one mobile communications network at the given second position of the second unmanned aerial vehicle. This embodiment is advantageous in particular when the quality of the at least one mobile communications network at the first height relative to the ground and/or to standard elevation zero has been determined and, if applicable, optimized, i.e. the air corridor at the first height is surveyed and qualified, in order to survey other flying heights easily. This is done by having the second unmanned aerial vehicle fly along the second linear path at the second height relative to the ground and/or to standard elevation zero, with the unmanned aerial vehicle controlling the second unmanned aerial vehicle, for instance by means of a local radio link.

In this regard it is also preferred that the method comprises the step: controlling the second unmanned aerial vehicle by means of at least one of the plurality of control devices in turn in the vicinity of the unmanned aerial vehicle. The unmanned aerial vehicle effectively acts as a relay in order to transfer to the second unmanned aerial vehicle, control signals received from the control devices and/or from a ground station and in particular received via the mobile communications network.

Alternatively or additionally, the method can comprise the step: autonomous flying of the unmanned aerial vehicle along the already flown linear path. Assuming that the already flown linear path is qualified, i.e. there is a sufficient mobile communications link along the entire linear path, the unmanned aerial vehicle can safely travel the already flown linear path autonomously, and in the process can maintain a continuous connection to at least one of the control devices and/or to a ground station via the mobile communications connection. Since the unmanned aerial vehicle controls the second unmanned aerial vehicle by means of the local radio link, there is hence also a continuous communications link to the second unmanned aerial vehicle along the second linear path.

According to another preferred development, the method comprises the step: once the quality of the at least one mobile communications network is determined, checking whether the quality is sufficient for clearance of the linear path and/or of the air corridor for additional unmanned aerial vehicles; and/or optimizing the at least one mobile communications network along the linear path according to the determined quality. After the first-mentioned step, a check is performed, for example, to ascertain whether along the, preferably entire, linear path a signal strength of the measured mobile communications network is sufficient to maintain continually a data connection between the unmanned aerial vehicle and a control device and/or a ground station.

If this is the case, the linear path can be given clearance, because it is guaranteed that additional unmanned aerial vehicles and/or the unmanned aerial vehicle can be controlled end to end by means of a mobile communications connection along the linear path certified in this way. If it is identified after the second proposed method step that in segments along the linear path there is insufficient signal strength of the mobile communications network, so for instance the mobile communications connection between the unmanned aerial vehicle and the mobile communications network is severed, then based on the likewise determined position data, the mobile communications network in this region can be improved by erecting additional mobile communications transmitters, expanding existing mobile communications transmitters and/or modifying an orientation of the existing mobile communications transmitters.

In particular if the quality has been deemed sufficient for clearance of the linear path and/or of the air corridor, then according to a preferred development of the method, at least one additional unmanned aerial vehicle flies along the linear path and/or the air corridor. In addition, the linear path and/or air corridor concerned can be plotted on electronic maps as certified for autonomous operation of unmanned aerial vehicles.

According to another preferred development, the method comprises the step: during the flying of the linear path and/or in the air corridor by the at least one additional unmanned aerial vehicle and/or the unmanned aerial vehicle, determining the quality of the at least one mobile communications network at the given position in the air corridor during the flying of the linear path and/or in the air corridor by the at least one additional unmanned aerial vehicle and/or the unmanned aerial vehicle. For this purpose, a software development kit, SDK, can be provided in the at least one additional unmanned aerial vehicle and/or in the unmanned aerial vehicle, which kit measures the quality of the at least one mobile communications network during each flight. The measurement data can be transmitted during the flight or after landing to a ground station, and evaluated there. Said SDL can be used to increase the attained accuracy of the quality in the flight corridor, to check the flight corridor regularly for a minimum quality and/or to extend the flight corridor. For example, the additional unmanned aerial vehicle, which is equipped with the SDK, at a distance from the certified linear path, can fly an additional linear path at the edge region of the air corridor. If this additional linear path has greater than a sufficient quality, the certified air corridor can be extended to include this additional linear path. If, however, provision deficiencies such as dead zones in the at least one mobile communications network are identified, these could be improved by subsequent measures. The aforementioned steps can determine the limits of the certified air corridor and extend the air corridor in a quasi-automated manner.

In this regard, according to yet another preferably embodiment, the method comprises the step: during and/or after the flying of the linear path, transmitting the determined quality of the at least one mobile communications network to at least one control device and/or to an evaluation device.

According to a preferred development, the control devices are embodied as temporary ground control stations, or TGCS for short. The TGCS preferably comprises a portable computer, for instance a laptop, which communicates with the unmanned aerial vehicle via the radio link. A joystick and/or a steering wheel can be provided for easy control of the aerial vehicle. Likewise, the TGCS can be modelled on an aircraft cockpit comprising associated mechanisms for facilitating intuitive, simple control of the unmanned aerial vehicle.

The object of the invention is also achieved by an arrangement comprising the unmanned aerial vehicle and the plurality of radio-based control devices configured to perform the above-described method.

SHORT DESCRIPTION OF THE DRAWINGS

The invention is described in greater detail below using preferred exemplary embodiments with reference to the enclosed drawing, in which:

FIG. 1 is a schematic view of the arrangement for performing a method according to a preferred exemplary embodiment of the invention.

DETAILED DESCRIPTION OF THE EXEMPLARY EMBODIMENTS

FIG. 1 shows in a schematic view an arrangement comprising an unmanned aerial vehicle 1 and a plurality of radio-based control devices 2. The unmanned aerial vehicle 1, which is only shown schematically, is embodied as a quadcopter and equipped with a mobile communications receiver 3 and a positioning device 4.

The control devices 2 are configured as a remote control, also known as a radio remote control, for controlling remotely the unmanned aerial vehicle 1 by means of visual navigation. In the exemplary embodiment shown, four control devices 2 are each spaced approximately 500 to 1000 metres apart from one another on the ground 5 along a ground path 6. Starting from the left-hand side in FIG. 1, a first pilot uses the first control device 2, shown on the far left in FIG. 1, to control the unmanned aerial vehicle 1 by means of visual navigation until the unmanned aerial vehicle 1 enters a reception range of the second control device 2, shown on the right of the first control device 2 in FIG. 1. A second pilot, who is controlling the second control device 2, assumes control of the unmanned aerial vehicle 1 from the first pilot. This method is repeated until a fourth pilot of the fourth control device 2, shown on the far right in FIG. 1, has assumed control of the unmanned aerial vehicle 1 likewise by means of visual navigation.

The unmanned aerial vehicle 1 has thus travelled in an air corridor 8, a linear path 7 corresponding to the ground path 6. During the entire flight along the linear path 7, the unmanned aerial vehicle 1 has been controlled manually by the pilots by means of visual navigation in accordance with what are known as line-of-sight rules, LOS for short, and thus at no position was farther than in visual contact range 9 from at least one of the control devices 2.

In order to maintain a continuous communications link to the unmanned aerial vehicle 1 during the entire flight along the linear path 7, however, the above-described method requires the plurality of mutually-spaced control devices 2 and associated pilots. Alternatively, it is desirable to maintain the continuous communications link through an existing terrestrial mobile communications network via a Long Term Evolution, LTE, mobile communications protocol. For this purpose, however, it must be ascertained whether the terrestrial mobile communications network has a sufficient signal strength along the entire linear path 7 in the air corridor 8 in order that the control devices 2 can be substituted by the mobile communications network.

To this end, the unmanned aerial vehicle 1 is equipped with a mobile communications receiver 3 comprising a transceiver, for instance an LTE modem, for communicating with the mobile communications network, and is equipped with a positioning device 4. The positioning device 4 is designed to determine a position of the unmanned aerial vehicle 1 in the air corridor 8 by receiving relevant position information from a satellite navigation network, which is not shown here. In addition, the unmanned aerial vehicle 1 is configured, as described previously, to use navigation instructions received from the radio-based control devices 2 and from the mobile communications receiver 3 to navigate along the linear path 7.

In order to check first whether there is sufficient signal strength in the air corridor 8 and in particular along the entire linear path 7, i.e. whether the air corridor 8 is "qualified" for additional autonomous flying operation, the unmanned aerial vehicle 1 is controlled, as previously described, manually in accordance with LOS rules along the entire linear path 7 by means of the plurality of control devices 2 in turn and segment by segment. The control can be performed by a plurality of pilots, in which case the control devices 2 can be embodied as temporary ground control stations, TGCS. Such TGCS stations usually comprise a portable computer, which communicates with the unmanned aerial vehicle 1 via a radio link. A joystick or a steering wheel is provided for easy control of the aerial vehicle 1.

During the entire flight along the linear path 7, the mobile communications receiver 3 determines the quality of the mobile communications network or of a plurality of different mobile communications networks at the given position in the air corridor 8. For this purpose, the mobile communications receiver 3 repeatedly establishes data connections and/or voice connections to different destinations and measures the speed of an Internet connection and/or measures a call setup time. A controller provided in the unmanned aerial vehicle 1 controls the mobile communications receiver 3 and stores the data obtained in this way for further evaluation, for instance after the unmanned aerial vehicle 1 has landed.

In a further step, a check is made to ascertain whether the quality attained is sufficient for clearance of the linear path 7 and/or of the air corridor 8 for additional unmanned aerial vehicles for commercial use, i.e. the air corridor 8 is "qualified" for autonomous flight. Clearance is granted if along the entire linear path 7 there exists a continuous mobile communications connection of sufficient signal strength greater than a predefined threshold value, so that allowance is made for certain weather conditions or different antenna types.

If it is ascertained that the quality is insufficient, measures for optimizing the mobile communications network along the linear path 7 can be initiated according to the determined quality, for instance erecting additional transceiver masts of the mobile communications network and/or altering an antenna orientation of existing transceiver masts of the mobile communications network towards the air corridor 8.

In order to increase the accuracy of the quality, the above-described steps of flying the unmanned aerial vehicle 1 along the linear path 7 and determining the quality of the mobile communications network can be repeated, or different unmanned aerial vehicles 1 can fly the same linear path 7 or fly corresponding linear paths 7 in the same air corridor 8. Likewise, the unmanned aerial vehicle 1 can be flown along the linear path 7 in an outward direction and in a return direction. These flights are made as described above by visual navigation and controlled by the pilots of the control devices 2.

The qualities attained by the individual flights can be averaged statistically in order to obtain a more reliable statement of the quality. Flying the unmanned aerial vehicle 1 or the unmanned aerial vehicles 1 is performed during the individual flights at a predetermined constant height relative to the ground 5 or at a constant relative height above standard elevation zero.

In order to detect the quality of the mobile communications network at other flight heights along a second linear path 10 in the same air corridor 8 or in another flight corridor, which extends parallel to the air corridor 8, the unmanned aerial vehicle 1 can be flown along the already flown linear path 7 at a first height relative to the ground 5 and/or to standard elevation zero. Since the already flown linear path 7 is "qualified", the unmanned aerial vehicle 1 can travel the linear path 7 autonomously.

In parallel with the unmanned aerial vehicle 1, a second unmanned aerial vehicle 11 is made to fly along the second linear path 10 spaced apart from, but approximately parallel to, the linear path 7 or at a second height relative to the ground 5 and/or to standard elevation zero. The second unmanned aerial vehicle 11, just like the unmanned aerial vehicle 1, is likewise equipped with a mobile communications receiver 3, which is not shown in FIG. 1, and with a positioning device 4.

The second unmanned aerial vehicle 11 is controlled by means of a local radio link by the unmanned aerial vehicle 1, which thus acts as a relay between a ground station 12 or one of the control devices 2 and the second unmanned aerial vehicle 11. The second unmanned aerial vehicle 11 determines during its flight the quality of the mobile communications network at the given second position of the second unmanned aerial vehicle 11. During the flight, the determined quality can be transferred from the second unmanned aerial vehicle 11 via the local radio link to the unmanned aerial vehicle 1, and from this aerial vehicle via the existing mobile communications connection to the ground station 12 or to the control device 2.

In order to check on a continuous basis a linear path 7 and/or air corridor 8, which has already been qualified and cleared for commercial use, in terms of the quality of the mobile communications network, the unmanned aerial vehicle 1 or additional unmanned aerial vehicles 13 can be equipped with a measurement SDK, software development kit, which during every flight determines continuously the current quality of the mobile communications network at the given position in the air corridor 8, and during or after the flight, transmits the attained quality to the ground station 12 for further processing and evaluation.

The exemplary embodiments described are merely examples that can be modified and/or expanded in various ways in the claims. Any feature that was described for a specific exemplary embodiment can be used in isolation or in combination with other features in any other exemplary embodiment. Any feature that was described for an exemplary embodiment of a specific category can also be used correspondingly in an exemplary embodiment of another category.

LIST OF REFERENCES unmanned aerial vehicle 1
control device 2
mobile communications receiver 3
positioning device 4
ground 5
ground path 6
linear path 7
air corridor 8
visual contact range 9
second linear path 10
second unmanned aerial vehicle 11
ground station 12
additional unmanned aerial vehicle 13

The invention claimed is:

1. A method for determining a quality of at least one mobile communications network in an air corridor that is safe for autonomous operation of unmanned aerial vehicles, which method comprises:
    providing an unmanned aerial vehicle comprising a mobile communications receiver configured to determine the quality of the at least one mobile communications network, and comprising a positioning device configured to determine a position of the unmanned aerial vehicle in the air corridor,
    defining a linear path in the air corridor:
    arranging a plurality of radio-based control devices configured to control the unmanned aerial vehicle, wherein the plurality of radio-based control devices are spaced apart from one another on a ground, such that the unmanned aerial vehicle when flying the linear path at no position is farther than in visual contact range from at least one of the control devices;
    with a plurality of pilots, flying the unmanned aerial vehicle along the linear path by controlling the unmanned aerial vehicle by means of the plurality of control devices in turn, wherein the individual pilot controlling the unmanned aerial vehicle at each point along the linear path is in visual contact range with the unmanned aerial vehicle; and
    during the flying of the linear path, determining the quality of the at least one mobile communications network at the given position in the air corridor.

2. The method according to claim 1, comprising the step:
    repeating the steps of flying the, and/or an additional, unmanned aerial vehicle and determining the quality of the at least one mobile communications network; and/or
    flying the, and/or the additional, unmanned aerial vehicle along the linear path in an outward direction and in a return direction; and/or
    determining the quality of the at least one mobile communications network at the given position by statistical averaging of the qualities determined during the repeated individual flights and/or the individual flights in the outward direction and return direction.

3. The method according to claim 2, comprising the step:
    flying the, and/or the additional, unmanned aerial vehicle during the individual flights at a predetermined constant height relative to the ground or at a constant relative height above standard elevation zero; and/or
    flying the, and/or the additional, unmanned aerial vehicle during the individual flights at different predetermined heights relative to the ground and/or to standard elevation zero.

4. The method according to claim 1, comprising the steps:
    flying the unmanned aerial vehicle along the already flown linear path at a first height relative to the ground and/or to standard elevation zero;
    flying a second unmanned aerial vehicle along a second linear path spaced apart from the linear path and/or at a second height relative to the ground and/or to standard elevation zero by the unmanned aerial vehicle controlling the unmanned second aerial vehicle; and
    during the flying of the second linear path, determining the quality of the at least one mobile communications network at the given second position of the second unmanned aerial vehicle.

5. The method according to claim 4, comprising the step:
controlling the second unmanned aerial vehicle by means of at least one of the plurality of control devices in turn and/or by a ground station via the unmanned aerial vehicle.

6. The method according to claim 4, comprising the step:
autonomous flying of the, and/or an additional, unmanned aerial vehicle along the already flown linear path.

7. The method according to claim 1, comprising the step:
once the quality of the at least one mobile communications network is determined, checking whether the quality is sufficient for clearance of the linear path and/or of the air corridor for additional unmanned aerial vehicles; and/or
optimizing the at least one mobile communications network along the linear path according to the determined quality.

8. The method according to claim 1, comprising the step:
flying the one, and/or at least one, additional unmanned aerial vehicle along the linear path and/or the air corridor.

9. The method according to claim 1, comprising the step:
during the flying of the linear path and/or in the air corridor by the at least one additional, and/or the, unmanned aerial vehicle, determining the quality of the at least one mobile communications network at the given position in the air corridor during the flying of the linear path or in the air corridor by the at least one additional, and/or the, unmanned aerial vehicle.

10. The method according to claim 1, comprising the step:
during and/or after the flying of the linear path, transmitting the determined quality of the at least one mobile communications network to at least one control device and/or to a ground station.

11. The method according to claim 1, wherein the control devices are embodied as temporary ground control stations.

12. An arrangement comprising the unmanned aerial vehicle and the plurality of radio-based control devices configured to perform the method according to claim 1.

13. The method according to claim 5, comprising the step:
autonomous flying of the, and/or an additional, unmanned aerial vehicle along the already flown linear path.

14. The arrangement comprising the unmanned aerial vehicle and the plurality of radio-based control devices configured to perform the method according to claim 2.

* * * * *